US011489769B2

(12) United States Patent
Suthar et al.

(10) Patent No.: US 11,489,769 B2
(45) Date of Patent: Nov. 1, 2022

(54) VIRTUALIZED RADIO ACCESS NETWORK ARCHITECTURE FOR APPLICATIONS REQUIRING A TIME SENSITIVE NETWORK

(71) Applicant: Cisco Technology, Inc., San Jose, CA (US)

(72) Inventors: Om Prakash Suthar, Bolingbrook, IL (US); Arghya Mukherjee, Acton, MA (US); Aeneas Dodd-Noble, Andover, MA (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/400,386

(22) Filed: May 1, 2019

(65) Prior Publication Data

US 2020/0304408 A1   Sep. 24, 2020

Related U.S. Application Data

(60) Provisional application No. 62/820,925, filed on Mar. 20, 2019.

(51) Int. Cl.
*H04L 45/00*   (2022.01)
*H04L 12/46*   (2006.01)
(Continued)

(52) U.S. Cl.
CPC .......... *H04L 45/70* (2013.01); *H04L 12/4641* (2013.01); *H04L 43/0876* (2013.01);
(Continued)

(58) Field of Classification Search
None
See application file for complete search history.

(56) References Cited

U.S. PATENT DOCUMENTS

2010/0195617 A1   8/2010   Park et al.
2011/0188398 A1   8/2011   Baba et al.
(Continued)

FOREIGN PATENT DOCUMENTS

WO   2018177656 A1   10/2018

OTHER PUBLICATIONS

3GPP Organizational Partners, "3rd Generation Partnership Project; Technical Specification Group Services and System Aspects; Feasibility Study on LAN Support in 5G (Release 16)", 3GPP TR 22.821 V16.1.0, Jun. 2018, 52 pages.
(Continued)

*Primary Examiner* — Adnan Baig
(74) *Attorney, Agent, or Firm* — Edell, Shapiro & Finnan, LLC

(57) ABSTRACT

Techniques associated with localizing data traffic for a time sensitive network within a virtualized radio access network are provided. In one embodiment, a method includes determining that a user equipment (UE) is associated with a time sensitive network; and localizing data traffic for the UE within a virtualized radio access network based on determining that the data traffic for the UE can be localized at one centralized user plane component of the virtualized radio access network for the time sensitive network. The data traffic can be Layer-2 data traffic or unstructured data traffic.

20 Claims, 7 Drawing Sheets

(51) Int. Cl.
*H04W 8/18* (2009.01)
*H04L 43/0876* (2022.01)
*H04L 67/141* (2022.01)

(52) U.S. Cl.
CPC ............ *H04L 45/66* (2013.01); *H04L 67/141* (2013.01); *H04W 8/18* (2013.01)

(56) References Cited

U.S. PATENT DOCUMENTS

| | | | |
|---|---|---|---|
| 2012/0115480 A1 | 5/2012 | Takahashi et al. | |
| 2012/0294226 A1 | 11/2012 | Racz et al. | |
| 2015/0103831 A1 | 4/2015 | Chandhoke et al. | |
| 2016/0119777 A1 | 4/2016 | Kaczmarska-Wojtania et al. | |
| 2016/0164930 A1* | 6/2016 | Hua ........................ | H04W 4/08 370/260 |
| 2016/0218794 A1 | 7/2016 | Matsumoto | |
| 2018/0343600 A1 | 11/2018 | Ma et al. | |
| 2019/0191467 A1* | 6/2019 | Dao ....................... | H04W 60/00 |
| 2019/0297538 A1* | 9/2019 | Keller ............... | H04W 36/0022 |
| 2019/0372837 A1* | 12/2019 | Yang ........................ | H04L 43/08 |
| 2020/0045612 A1* | 2/2020 | Stauffer ................ | H04W 40/36 |
| 2020/0221521 A1* | 7/2020 | Cui ....................... | H04W 76/15 |
| 2020/0267576 A1* | 8/2020 | Bedekar ................ | G06F 9/5077 |
| 2021/0219357 A1 | 7/2021 | Talebi Fard et al. | |

OTHER PUBLICATIONS

3GPP Organizational Partners, "3rd Generation Partnership Project; Technical Specification Group Services and System Aspects; System Architecture for the 5G System; Stage 2 (Release 15)", 3GPP TS 23.501 V15.4.0, Dec. 2018, 236 pages.
3GPP Organizational Partners, "3rd Generation Partnership Project; Technical Specification Group Services and System Aspects; Procedures for the 5G System; Stage 2 (Release 15)", 3GPP TS 23.502 V15.4.1, Jan. 2019, 347 pages.
3GPP Organizational Partners, "3rd Generation Partnership Project; Technical Specification Group Services and System Aspects; Procedures for the 5G System; Stage 2 (Release 15)", 3GPP TS 23.502 V15.5.1, Apr. 2019, 354 pages.
3GPP Organizational Partners, "3rd Generation Partnership Project; Technical Specification Group Services and System Aspects; Study on enhancement of 5GS for Vertical and LAN Services (Release 16)", 3GPP TR 23.734 V16.0.0, Dec. 2018, 107 pages.
3GPP Organizational Partners, "3rd Generation Partnership Project; Technical Specification Group Services and System Aspects; Telecommunication management; Charging management; 5G system; Services, operations and procedures of charging using Service Based Interface (SBI) (Release 15)", 3GPP TS 32.290 V15.3.0, Mar. 2019, 27 pages.
3GPP Organizational Partners, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.4.0, Dec. 2019, 67 pages.
3GPP Organizational Partners, "3rd Generation Partnership Project; Technical Specification Group Radio Access Network; NR; NR and NG-RAN Overall Description; Stage 2 (Release 15)", 3GPP TS 38.300 V15.4.0, Dec. 2018, 97 pages.

3GPP Organizational Partners, "3rd Generation Partnership Project; Technical Specification Group Radio Access Network; NG-RAN; Architecture description (Release 15)", 3GPP TS 38.401 V15.4.0, Dec. 2018, 40 pages.
Cisco Systems Inc., "Transparent Layer 2 Protocol Tunneling and PDU Filtering", https://www.cisco.com/c/en/US/td/docs/ios/12_0s/feature/guide/l2pt.html, May 7, 2004, 18 pages.
Business Wire, "Rakuten to Invest in Mobile Industry Innovator Altiostar", https://www.businesswire.com/news/nome/20190211005851/en/Rakuten-Invest-Mobile-Industry-Innovator-Altiostar, Feb. 12, 2019, 3 pages.
Cisco, "Reimagining the End-to-End Mobile Network in the 5G Era", https://www.cisco.com/c/en/us/solutions/service-provider/mobile-internet/reimagining-mobile-network.html, downloaded Apr. 16, 2019, 16 pages.
Metaswitch Networks, "What is the 5G Session Management Function (SMF)?", https://www.metaswitch.com/knowledge-center/reference/what-is-the-5g-session-management-function-smf, downloaded Apr. 16, 2019, 5 pages.
International Search Report and Written Opinion in counterpart International Application No. PCT/US2020/022566, dated Jul. 1, 2020, 22 pages.
NGMN Alliance, "NGMN Overview on 5G RAN Functional Decomposition", Version 1.0, https://www.ngmn.org/wp-content/uploads/Publications/2018/180226_NGMN_RANFSX_D1_V20_Final.pdf, Feb. 24, 2018, 48 pages.
Nokia et al., "NR support for TSN traffic patterns", 3GPP TSG-RAN WG2 Meeting #104, R2-1817270, Agenda item: 11.7.2.2, Nov. 2018, 9 pages.
ZTE et al., "Stage 2 TP for Functional split between NG-RAN and 5G-CN", 3GPP TSG RAN WG3 Meeting #95bis, R3-171392, Agenda item: 10.1.3, Apr. 2017, 2 pages.
3GPP, "3rd Generation Partnership Project; Technical Specification Group Radio Access Network; NG-RAN; Architecture description (Release 15)", 3GPP TS 38.401 V15.5.0, Mar. 2019, 39 pages.
3GPP, "3rd Generation Partnership Project; Technical Specification Group Radio Access Network; NR; NR and NG-RAN Overall Description; Stage 2 (Release 15)", 3GPP TS 38.300 V15.5.0, Mar. 2019, 97 pages.
3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.5.0 Mar. 2019, 68 pages.
3GPP, "3rd Generation Partnership Project; Technical Specification Group Services and System Aspects; Telecommunication management; Charging management; 5G system; Services, operations and procedures of charging using Service Based Interface (SBI) (Release 16)", 3GPP TS 32.290 V16.0.0, Mar. 2019, 28 pages.
3GPP, "3rd Generation Partnership Project; Technical Specification Group Services and System Aspects; Procedures tor the 5G System; Stage 2 (Release 16)", 3GPP TS 23.502 V16.0.2, Apr. 2019, 419 pages.
3GPP, "3rd Generation Partnership Project; Technical Specification Group Services and System Aspects; System Architecture for the 5G System; Stage 2 (Release 16)", 3GPP TS 23.501 V16.0.2, Apr. 2019, 317 pages.
Nokia, "Mobile transport convergence using deterministic Time-Sensitive Networks", Nokia White Paper, 2019, 11 pages.

* cited by examiner

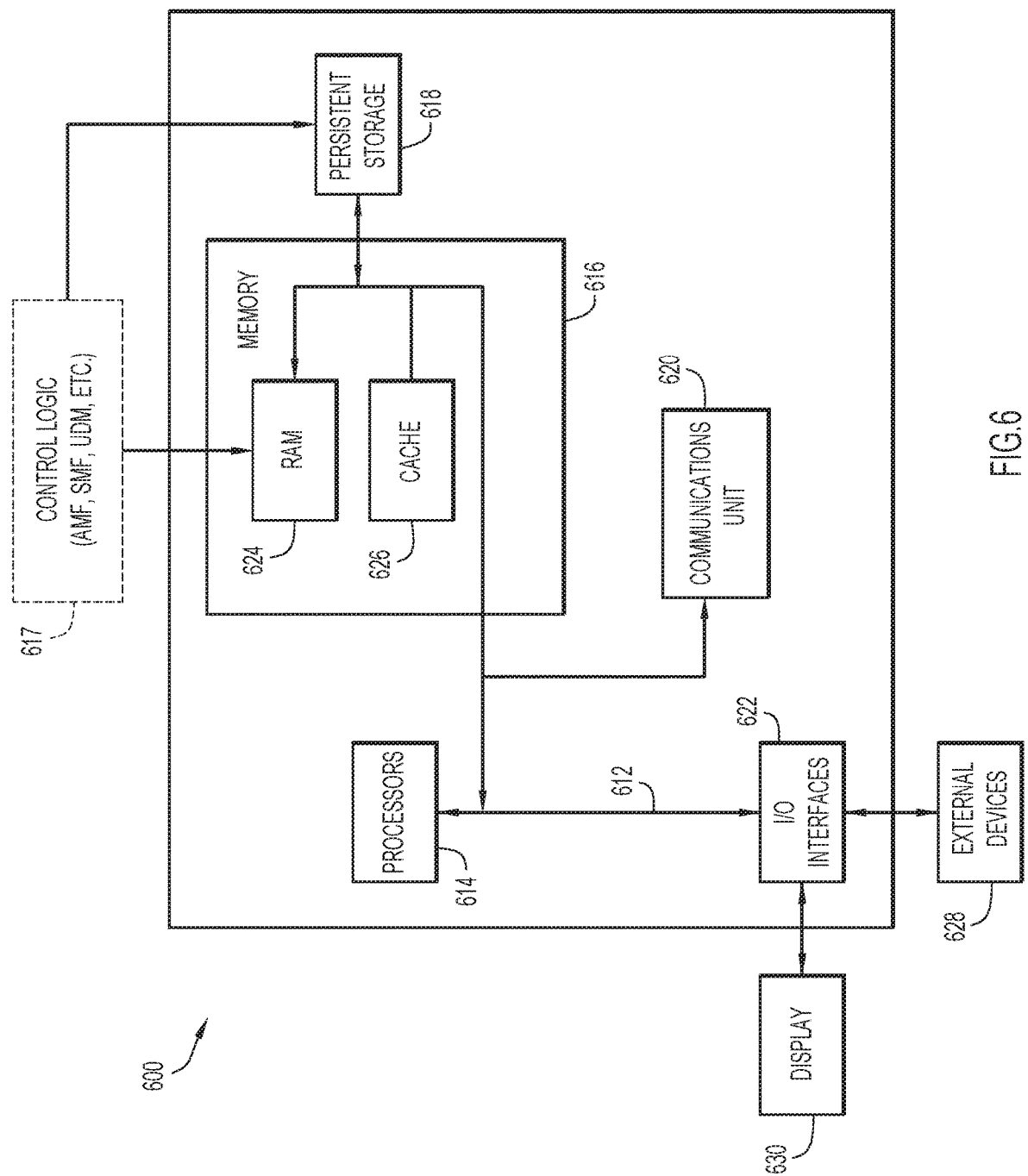

VIRTUALIZED RADIO ACCESS NETWORK ARCHITECTURE FOR APPLICATIONS REQUIRING A TIME SENSITIVE NETWORK

CROSS-REFERENCE TO RELATED APPLICATION

This application claims the benefit of priority under 35 U.S.C. § 119 to U.S. Provisional Patent Application Ser. No. 62/820,925, entitled "VIRTUALIZED RADIO ACCESS NETWORK ARCHITECTURE FOR APPLICATIONS REQUIRING A TIME SENSITIVE NETWORK," filed on Mar. 20, 2019, the disclosure of which application is hereby incorporated by reference in its entirety.

TECHNICAL FIELD

The present disclosure relates to mobile wireless network equipment and services.

BACKGROUND

Fifth Generation (5G) networks have use cases that need to provide support for Time Sensitive Networks (TSNs). A virtualized Radio Access Network (vRAN) architecture is not aware of TSN requirements. Accordingly, there are significant challenges in supporting TSNs for vRAN architectures.

BRIEF DESCRIPTION OF THE DRAWINGS

FIG. 6 is a hardware block diagram of a computing device that may perform functions described herein in connection with the techniques depicted in FIGS. 1-5, according to an example embodiment.

DESCRIPTION OF EXAMPLE EMBODIMENTS

Overview

Figure 1:
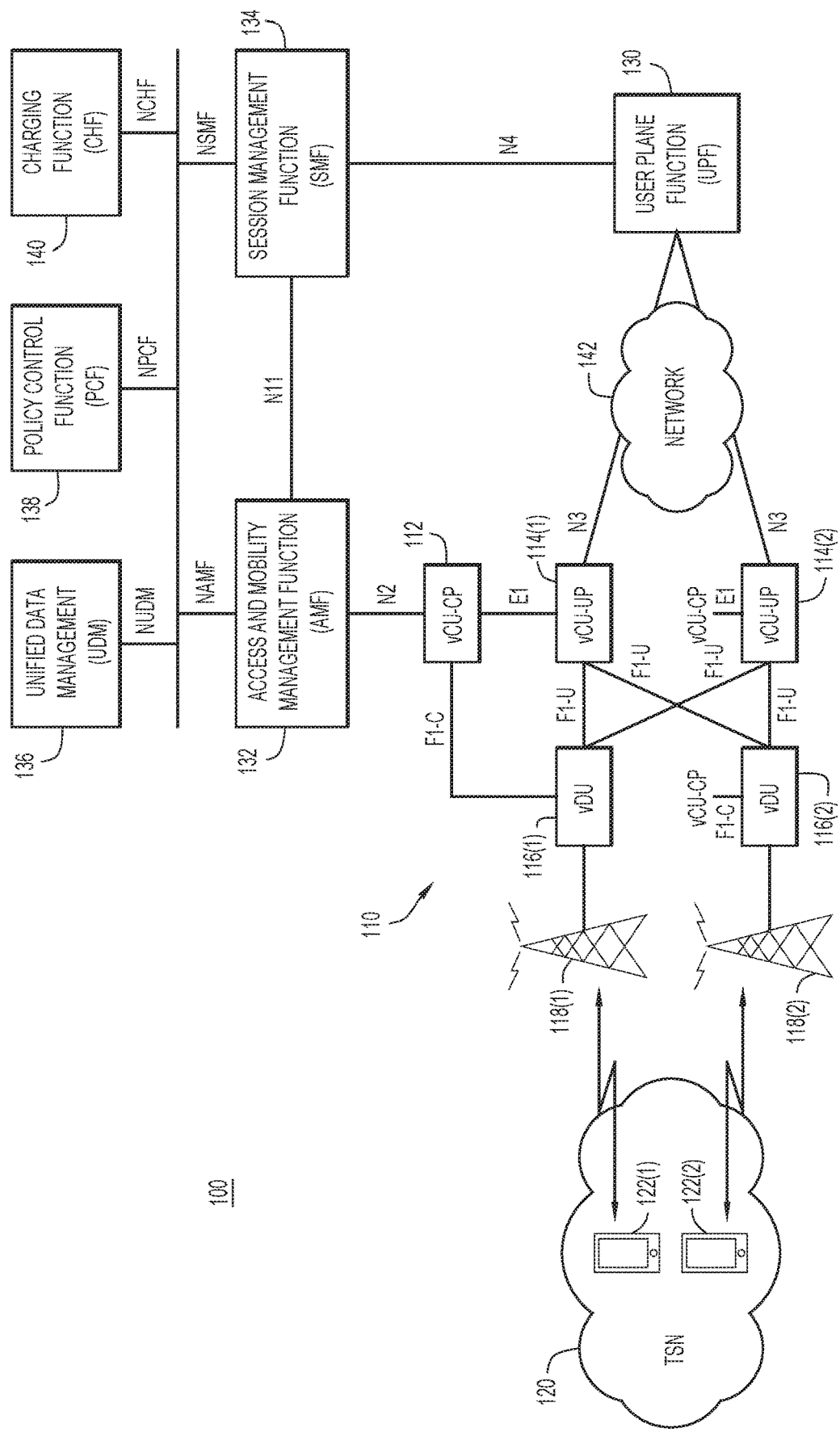
FIG. 1 is a block diagram of a system depicting a virtualized Radio Access Network (vRAN) in which techniques for providing an optimized data path for a Time Sensitive Network (TSN) may be implemented, according to an example embodiment.

Presented herein are techniques to leverage a virtualized Radio Access Network (vRAN) split architecture to set-up a Time Sensitive Network (TSN) that is geographically localized in the coverage area of a single or a small set of next generation NodeBs (gNBs). In at least one embodiment, provided herein is a system and method to provide an optimized data path localized within the vRAN for a TSN session in order to reduce latency and jitter for the TSN session.

A computer-implemented method is provided in one example embodiment and may include determining that a user equipment (UE) is associated with a time sensitive network; and localizing data traffic for the UE within a virtualized radio access network based on determining that the data traffic for the UE can be localized at one centralized user plane component of the virtualized radio access network for the time sensitive network. The data traffic can be Layer-2 data traffic or unstructured data traffic.

Example Embodiments

Discussed herein are features associated with RAN architectures. In some instances, a RAN architecture can be implemented as a centralized (disaggregated) RAN architecture that includes the split of a base station, such as a gNB, into a Central (or Centralized) Unit (CU) and one or several Distributed Units (DUs). Further disaggregation may include separation of the CU into a Centralized Unit Control Plane (CU-CP) component and a Centralized Unit User Plane (CU-UP) component.

Further, a RAN architecture can be virtualized in which hardware, software, and networking resources of one or more compute nodes can be abstracted to provide functionality for RAN nodes in order to implement a vRAN architecture in which functionality for the CU (and its disaggregated components, if applicable) can be implemented as a virtualized CU (vCU, including disaggregation into a vCU-CP and vCU-UP(s)) and functionality for the DUs can be implemented as virtualized DUs (vDUs).

Networks such as 3rd Generation Partnership Project (3GPP) 5G networks have use cases that need to provide mechanisms for Layer-2 (L2) Ethernet Packet Data Unit (PDU) or unstructured PDU (e.g., non-Internet Protocol (IP) PDU) support, specifically for Time Sensitive Networks (TSNs). Generally, a TSN involves time-sensitive transmissions.

Applications that may require a TSN may include a wide variety of applications such as Internet of Things (IoT) applications, industrial automation applications, enterprise applications, or any other applications that involving time-sensitive transmissions that may have stringent requirements for packet loss, network latency, and jitter. In general, latency can be impacted by the transmission and processing of data packets while jitter can be impacted by the number of nodes or "hops" that data packets traverse during communications and also how much data buffering is allowed by end applications.

Normally, a vRAN is not aware of any such TSN requirements because when a user equipment (UE) initiates attach procedures vRAN components such as a virtualized Distributed Unit (vDU) and a virtualized Central Unit (vCU) forward the messages to an Access and Mobility Management Function (AMF) and after all control plane signaling is completed successfully an appropriate Packet Data Network (PDN) session is set-up in User Plane Forwarding (UPF) and session management information is stored and maintained in Session Management Function (SMF) to support a TSN.

Presented herein are techniques to leverage a vRAN split architecture (vCU, vDU) and set-up a TSN that is geographically localized in the coverage area of a single or a small set of next generation NodeBs (gNBs). In particular, embodiments herein provide a system and method to provide an optimized data path that is localized within the vRAN for a TSN session of a UE in order to reduce latency and jitter for the TSN session.

FIG. 1 is a block diagram of a system 100 depicting a virtualized Radio Access Network (vRAN) 110 in which techniques for providing an optimized data path for a Time Sensitive Network (TSN) 120 may be implemented, according to an example embodiment. The system 100 includes nodes such as a vCU-CP 112, vCU-UPs 114(1)-114(2), and vDUs 116(1)-116(2) for a vRAN 110. A TSN 120 and user equipment (UEs) 122(1)-122(2) are also shown in system 100. System 100 also includes nodes such as a User Plane Function (UPF) 130, an Access and Mobility Management Function (AMF) 132, a Session Management Function (SMF) 134, a Unified Data Management (UDM) 136, a Policy Control Function (PCF) 138, a Charging Function (CHF) 140, and a network 142.

Various 3GPP interfaces, sometimes referred to as reference points, facilitate communications/interactions among various elements of system 100. Each vDU 116(1)-116(2) interfaces with an antenna assembly 118(1)-118(2) that include transmitter and receiver hardware to enable wireless radio frequency communication via antennas with UEs 122. Each vCU-UP 114(1)-114(2) may interface with both vDUs 116(1)-116(2) via corresponding F1-U interfaces in which the vDUs 116(1)-116(2) and vCU-UPs 114(1)-114(2) facilitate user plane communications (e.g., user data traffic) for user data paths associated with TSN 120, discussed in further detail herein.

Each vCU-UP 114(1)-114(2) may further interface with UPF 130 via corresponding N3 interfaces facilitated via network 142. In some embodiments, user data paths for a TSN may be provided via UPF 130. The UPF 130 is further in communication with SMF 134 via an N4 interface.

The vCU-CP 112 is in communication with each vDU 116(1)-116(2) via corresponding F1-C interfaces and each vCU-UP 114(1)-114(2) via corresponding E1 interfaces to facilitate control plane communications among the components of the vRAN 110. The vCU-CP 112 is further in communication AMF 132 via an N2 interface. The AMF 132 is further in communication with SMF 134 via an N11 interface.

Various communications/operations between AMF 132 and UDM 136, PCF 138, and CHF 140 may be facilitated via 3GPP Service-Based Interfaces (SBIs). In general, an SBI represents an interface for providing/exposing various services among network elements/functions of communication system 100. SBIs for various elements of system 100 include an Namf interface for AMF 132, an Nsmf interface for SMF 134, an Nudm interface for UDM 136, an Npcf interface for PCF 138, and an Nchf interface for CHF 140. Thus, AMF 132 can interface directly with each of UDM 136, PCF 138, and CHF 140 and also SMF 134 can interface directly with each of UDM 136, PCF 138, and CHF 140. In some embodiments, for example if the interface between AMF 132 and CHF 140 is down, AMF 132 can communicate/interact with CHF 140 via SMF 134.

The vCU-CP 112 operates to control the vDUs 116(1)-116(2) and the vCU-UPs 114(1)-114(2). The vCU-CP 112 and vCU-UPs 114(1)-114(2) may provide upper level operations of a radio signal processing stack, such as Packet Data Convergence Protocol (PDCP) functions and radio resource control, among others. vDUs 116(1)-116(2) may provide lower level operations of the radio signal processing stack, such as Radio Link Control (RLC), Medium Access Control (MAC), and physical (PHY) layer operations, among others. The split of operations of a radio signal processing stack among vDUs 116(1)-116(2) and vCU-UPs 114(1)-114(2) can be varied depending on implementation and/or configuration of vRAN 110. Antenna assemblies 118(1)-118(2) include hardware and/or software to perform baseband signal processing (such as modulation/demodulation) as well as hardware (e.g., transmitters and receivers) for signal transmission and signal reception via antenna assemblies 118(1)-118(2).

The UPF 130 may operate as a Virtual Network Function (VNF) to provide packet routing and forwarding operations for user data traffic and may also perform a variety of functions such as packet inspection, traffic optimization, Quality of Service (QoS), billing, policy enforcement and user data traffic, and billing operations (e.g., accounting, etc.) for UE 102(1)-102(2) sessions. Typically, the AMF 132 provides access authentication services, authorization services, and mobility management control. Typically, the SMF 134 is responsible for session management with individual functions being supported on a per session basis and also for selection and control of a UPF (e.g., UPF 130) for data transfer. Typically, the UDM 136 stores subscription data for subscribers (e.g., UEs 122(1)-122(2)) and the PCF 138 stores policy data for system 100. Typically, the CHF 140 provides charging services for UE sessions.

UEs 122(1)-122(2) may include Time Sensitive applications operating thereon for which a TSN is required. In various embodiments, UEs 122(1)-122(2) may be associated with any user, subscriber, employee, client, customer, electronic device, etc. wishing to initiate a flow in system 100. The terms 'UE device', 'UE', 'subscriber', 'UE/subscriber', 'mobile device', 'user', and variations thereof are inclusive of UEs used to initiate a communication, such as a computer, an electronic device such as a parking meter, vending machine, industrial device, automation device, enterprise device, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within system 100. UEs discussed herein may also be inclusive of a suitable interface to a human user such as a microphone, a display, a keyboard, or other terminal equipment. UEs discussed herein may also be any device that seeks to initiate a communication on behalf of another entity or element such as a program, a database, or any other component, device, element, or object capable of initiating an exchange within system 100. It is to be understood that any number of UEs may be present in system 100.

Through operations discussed herein, system 100 provides for the ability to optimize the data path for TSN sessions of UEs 122(1)-122(2) to reduce latency and jitter of TSN communications. In order to achieve the optimizations, the signaling from the PCF 138 via the AMF 132 is enhanced to localize all data traffic for a certain TSN (e.g., TSN 120) onto a certain vCU-UP (e.g., vCU-UP 114(1)). This allows user data traffic within TSN 120 to transit only through the particular vCU-UP instead of forwarding it to the UPF 130. Thus, a TSN bridge is facilitated by the particular vCU-UP to localize the user data traffic within vRAN 110. A TSN bridge is a Layer-2 Ethernet bridge that may be characterized as a local connection provided by the vCU-UP to facilitate routing of data traffic to/from multiple UE belonging to a TSN to one or more other UE belonging to the same TSN bridge.

For cases, in which a TSN may be spread across multiple vCU-UPs, the mechanism of localizing user data traffic within vRAN 110 is not used, rather a mechanism is provided to promote the TSN bridge for user data traffic at UPF 130.

For implementing techniques described herein, the PCF 138, UDM 136, and AMF 132 are configured with correlation to various TSN 120 capabilities (e.g., TSN policies, TSN requirements, TSN endpoint customers (e.g., UEs 122(1)-122(2)), etc.). PCF 138 is enhanced to store a TSN policy or requirements for TSN 120 and UDM 136 is enhanced to store subscriber data that indicates whether a given UE is a TSN endpoint customer and a TSN group identifier parameter "TSN-Group-ID", which is an identifier shared by all subscribers belonging to a same TSN group. In various embodiments, a TSN policy or requirements may include UE policy entitlements, authorization such as Layer-2 (e.g., VLAN, broadcast, default gateway, etc.), Service Area Restrictions (SARs), among others. A SAR is a policy parameter in PCF 138 which restricts whether a TSN bridge can be allowed/restricted in a specific vCU-UP or group of vCU-UP. In at least one embodiment, SARs can be defined based on geographical longitude-latitude for vCU-UPs. For embodiments herein, time-based billing for TSN sessions, also referred to herein as TSN PDU sessions, may be facilitated via CHF 140.

In at least one embodiment, subscriber data stored within UDM 136 can be enhanced to indicate that a given UE is a TSN endpoint customer by presetting a parameter referred to herein as a "TSN-Localization" parameter to a Boolean value, such as TRUE (e.g., TSN-Localization=TRUE), to indicate that the UE is a TSN endpoint customer. Setting the TSN-Localization parameter to FALSE can be used to indicate that a given UE is not a TSN endpoint customer. As noted above, subscriber data for the UE also includes the TSN-Group-ID parameter identifying the TSN group to which the UE belongs. In some embodiments, Customer Experience/Services may be used to automate the configuration of PCF 138 and UDM 136 with TSN capabilities.

Multiple TSNs may be configured within system 100. Additionally, in some embodiments, techniques provided herein may provide for the ability to identify a full-distance scalar function, which includes the geo-location of each UE, vCU-UP, and latency. In such embodiments, the TSN bridge may be set-up based on optimization parameters and prevent polarization. A mapping of all served vCU-UP can be provided so that each TSN can be homed into a certain CU-UP for the optimal UP given the TSN latency constraints.

Given that there are stringent requirements that need to be assumed for TSN implementations, as well as subsequent routing steps (e.g., hops) to contain delay and jitter for packets for Time Sensitive applications, provided herein are techniques which take into account TSN requirements in the context of a vRAN. Techniques herein provide a system and method to optimize the vRAN architecture to serve a TSN, first by selecting appropriate vRAN or UPF nodes, and second by performing local diversion of TSN traffic within the vRAN to allow an optimal low-latency path for TSN sessions.

Figure 2A:
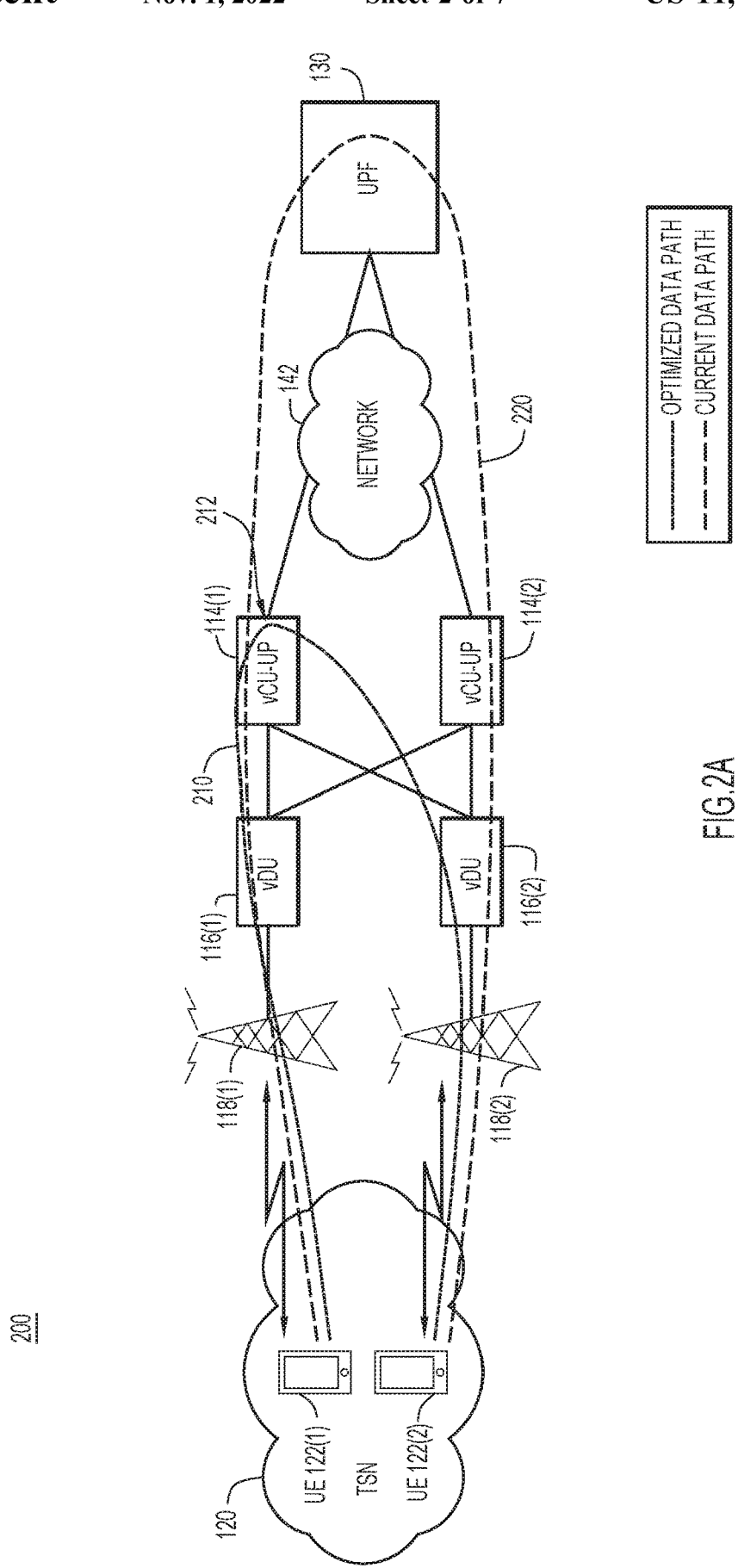
FIGS. 2A-2B are block diagrams depicting optimized data paths for the system of FIG. 1 for various example scenarios, according to an example embodiment.
Figure 2B:
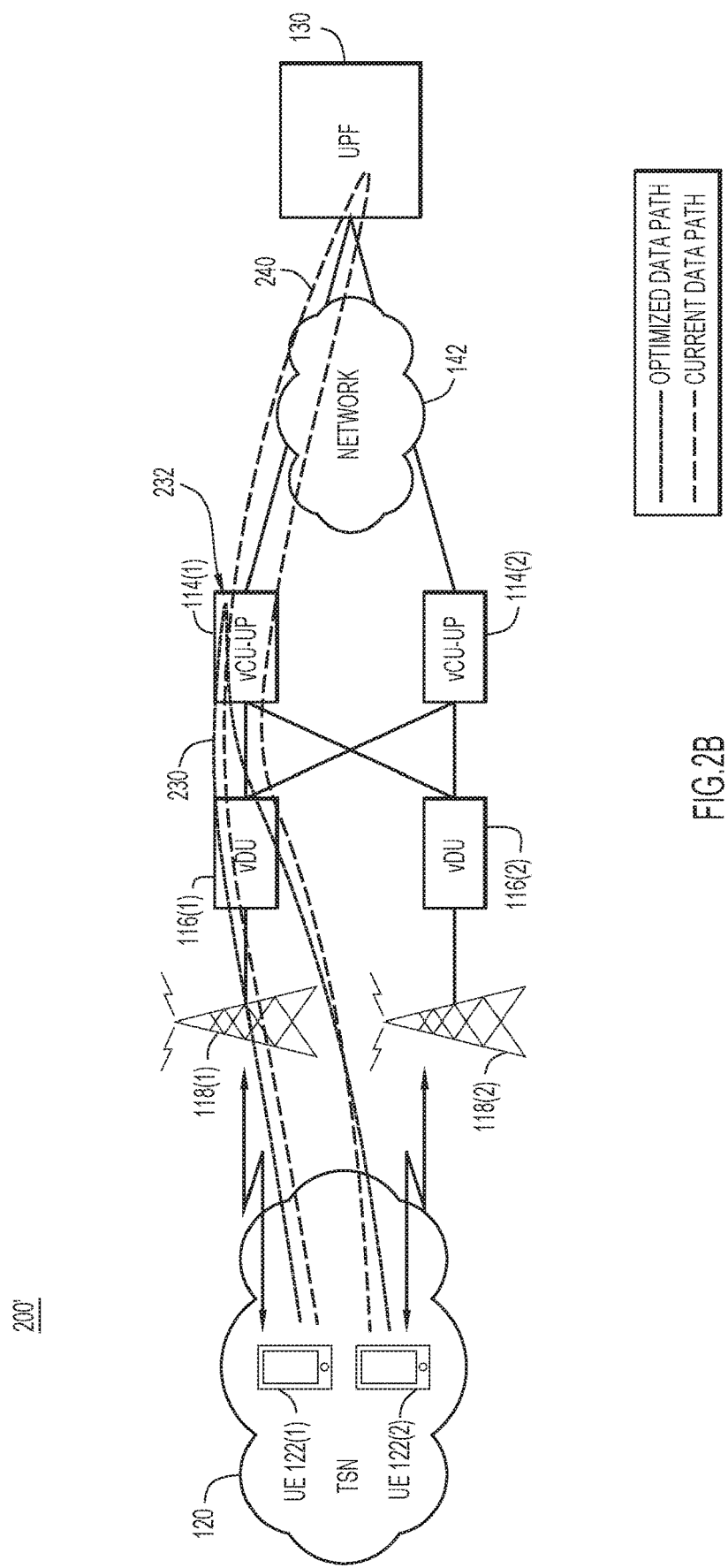

FIGS. 2A-2B are block diagrams depicting optimized data paths for the vRAN 110 of FIG. 1 for various example scenarios, according to an example embodiment. Reference to FIG. 1 is made in connection with the description of FIGS. 2A-2B.

FIG. 2A illustrates an example scenario 200 in which UE 122(1) and UE 122(2) are in communication with distinct vDUs, for example, UE 122(1) is in communication with vDU 116(1) (via antenna assembly 118(1)) and UE 122(2) is in communication with vDU 116(2) (via antenna assembly 118(2)).

As illustrated in FIG. 2A, the solution herein may provide an optimized data path 210 for TSN 120 for communications between UE 122(1) and UE 122(2) in which the optimized data path 210 can be localized within the vRAN 110. More specifically, a TSN bridge 212 is facilitated at vCU-UP 114(1) such that data traffic for TSN 120 flows only locally through the vCU-UP 114(1) for optimized data path 210 instead of flowing through the UPF 130, as illustrated by a current data path 220.

FIG. 2B illustrates an example scenario 200' in which UE 122(1) and UE 122(2) are in communication with a common vDU, for example, vDU 116(1).

As illustrated in FIG. 2B, the solution herein may provide an optimized data path 230 for TSN 120 for communications between UE 122(1) and UE 122(2) in which the optimized data path 230 can be localized within the vRAN 110. More specifically, a TSN bridge 232 is facilitated at vCU-UP 114(1) such that data traffic for TSN 120 flows only locally through the vCU-UP 114(1) for optimized data path 230 instead of flowing through the UPF 130, as illustrated by a current data path 240.

Figure 3:
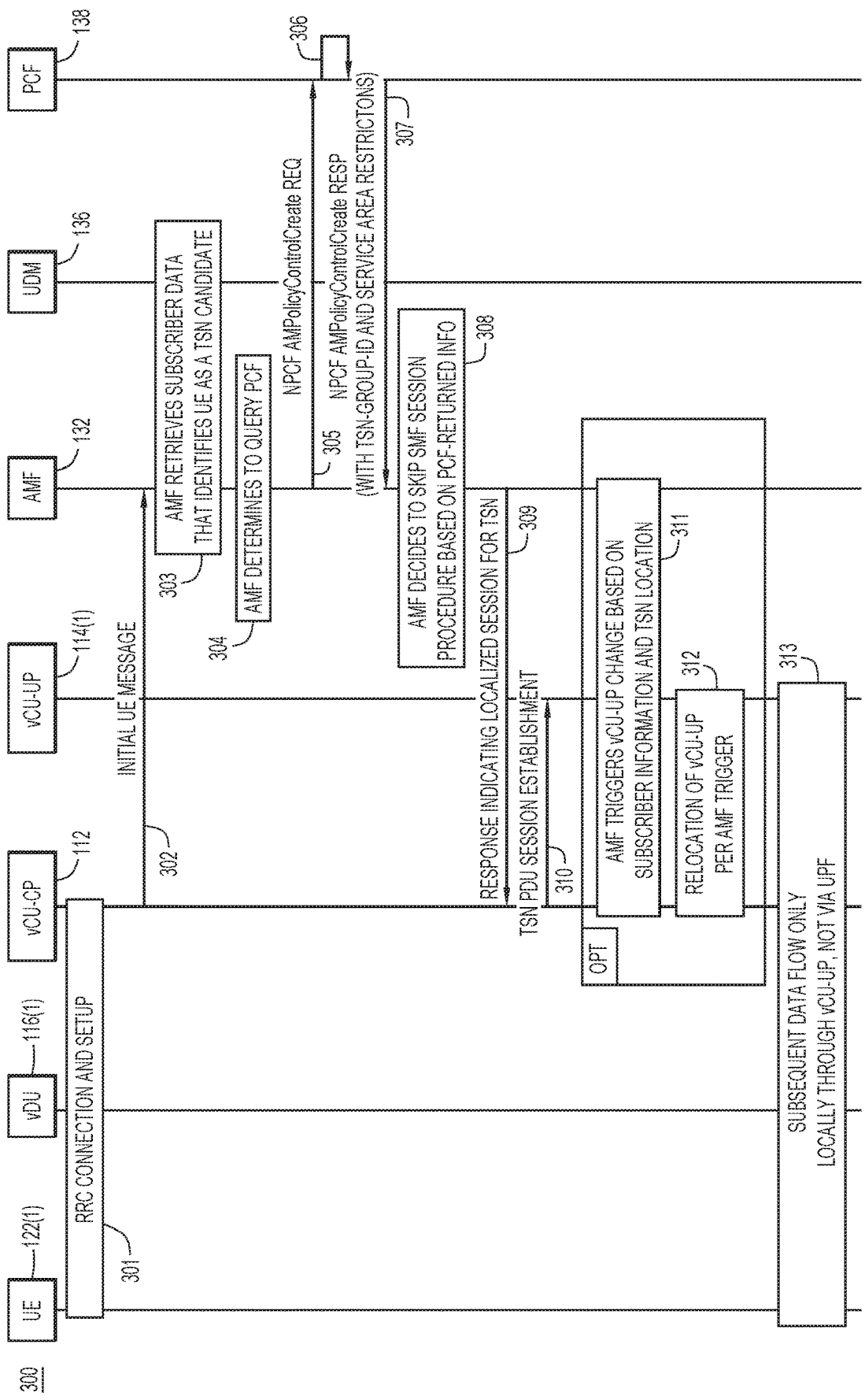
FIG. 3 is a message sequence diagram illustrating a call flow for facilitating a TSN bridge within the vRAN to provide an optimized data path that is localized within the vRAN, according to an example embodiment.

Referring to FIG. 3, FIG. 3 is a message sequence diagram 300 illustrating a call flow for facilitating a TSN bridge within vRAN 110 to provide an optimized data path localized within the vRAN 110, according to an example embodiment. FIG. 3 includes UE 122(1), vDU 116(1), vCU-CP 112, vCU-UP 114(1), AMF 132, UDM 136, and PCF 138. For FIG. 3, the call flow generally illustrates that AMF 132 uses information received from the PCF 138 to localize a session for UE 122(1) on a particular vCU-UP, for example, vCU-UP 114(1). The call flow is an extension of 3GPP Technical Specification (TS) 38.401, Section 8.9.1.

At 301, a Radio Resource Control (RRC) connection request and setup are performed between UE 122(1) and vCU-CP 112 as per 3GPP TS 38.401, Section 8.9.1. The connection request may include an attach type for UE 122(1) of Layer-2 PDU or PDU unstructured (e.g., non-IP). At 302, an initial UE message is sent from vCU-CP 112 to AMF 132 for the UE 122(1) session. The AMF 132 identifies the UE 122(1) attach type via the exchange at 302.

At 303, AMF 132 queries UDM 136 to retrieve subscriber data for the UE 122(1) and identify whether the UE 122(1) session is a TSN candidate (e.g., can be localized). The AMF 132 determines whether a data session for the UE at SMF 134/UPF 130 should be skipped based on subscriber data (e.g., preset in the UDM 136 as TSN endpoint customer, for example, TSN-Localization=TRUE) stored by UDM 136 for UE 122(1).

Determining that the UE 122(1) session is a TSN candidate for vRAN 110 localization forces AMF 132 to determine, at 304, (e.g. using a TSN localization procedure configured for control logic of AMF 132) that it is to query PCF 138 based on the UE profile/subscriber data identifying the UE as a TSN candidate that was received from UDM 136.

At 305-307, an exchange is performed between AMF 132 and PCF 138 using TSN specific parameters in order for AMF 132 to determine the TSN policy for TSN 120. For example, at 305, AMF sends (via the Npcf interface) an Npcf_AMPolicyControlCreate Request (Req) message to PCF 138. The message includes various parameters associated with UE 122(1) including the TSN-Group-ID for the TSN group of which UE 122(1) is a member and the current vCU-UP (e.g., vCU-UP 114(1)) allocated to handle data traffic for the UE 122(1).

At 306, PCF 138 determines whether localization for UE 122(1) is possible. The TSN-Group-ID received from AMF 132 can help PCF 138 determine whether current members of the TSN group can be localized and, if so, at what vCU-UP. Various outcomes are possible based on the determination made by PCF 138 at 306.

For example, based on a determination at 306 by PCF 138 that this is the first TSN session for the TSN group (e.g., no other UE of the group currently have TSN PDU sessions (data traffic) associated with the TSN), PCF 138 can select the vCU-UP with the least load in the serving area (e.g., geographical location) of the UE 122(1) to which to home (localize) data traffic for the TSN 120. The PCF 138 updates its database (e.g., the TSN policy for TSN 120) to identify the selected vCU-UP for the TSN 120. In one embodiment, the PCF 138 could use the current vCU-UP as supplied in the Npcf_AMPolicyControlCreate Request message to update its database for the TSN 120.

For this example, PCF 138 can send an Npcf_AMPolicyControlCreate Response (Resp) message at 307 that includes fields including a vCU-UP identifier, such as the IP address or a node identifier (node_id) for the selected vCU-UP at which the TSN group is to be homed, a L2 PDU identifier for the TSN bridge to be set-up, the TSN-Group-ID, SARs for the TSN 120, and also the parameter TSN-Localization=TRUE. In at least one embodiment, the L2 PDU identifier is a unique numeric value that can be assigned by the network (e.g., PCF 138) or selected by UE 122(1). In various embodiments, the L2 PDU identifier may be a Virtual Local Area Network (VLAN) address or a MAC address.

In another example, based on a determination by PCF 138 that this is not the first TSN session for the TSN group, PCF 138 can determine at 306 whether the current vCU-UP at which other members of the group (e.g., other UE) are homed is within the same serving area as UE 122(1). Based on a determination that the current vCU-UP for the TSN group is within the same serving area as UE 122(1), PCF 138 can send an Npcf_AMPolicyControlCreate Response (Resp) message at 307 that includes fields including the currently homed vCU-UP for the TSN group, the L2 PDU identifier for each TSN bridge set-up, the TSN-Group-ID, SARs, and the parameter TSN-Localization=TRUE for UE 122(1).

In yet another example, based on a determination by PCF 138 that the current vCU-UP for the TSN group is not within the same serving area as UE 122(1), PCF 138 can determine that the localization procedure is to be skipped because TSN localization for UE 122(1) would cause the TSN group to be spread across more than one vCU-UP. Based on such a determination that localization would cause the TSN group to be spread across more than one vCU-UP, PCF 138 can determine that a full data session is to be established for the UE via SMF 134 and homed on a single UPF (e.g., UPF 130).

For the embodiment of FIG. 3, it is assumed that this is the first TSN session for the TSN group to which UE 122(1) belongs in which case PCF 138 selects vCU-UP 114(1) to which to home the TSN group and sends an Npcf_AMPolicyControlCreate Response message at 307 that includes the vCU-UP identifier for the selected vCU-UP 114(1), a L2 PDU identifier for the TSN bridge to be set-up for UE 122(1), the TSN-Group-ID for the TSN group of which UE 122(1) is a member, SARs for the TSN 120, and also the parameter TSN-Localization=TRUE for UE 122(1).

At 308, AMF 132 determines based on the PCF 138 response (e.g., SARs) and session criteria for UE 122(1) (e.g., UE attach type PDN (PDU) unstructured or L2 PDU and TSN-Localization=TRUE) that it is to skip data session creation for UE 122(1) at SMF 134. At 309, AMF 132 augments the UE response to vCU-CP 112 to indicate a localized TSN session is to be used for UE 122(1) data traffic. The response includes the L2 PDU identifier for the TSN bridge that is to be set-up for localizing the UE 122(1) data traffic within vRAN 110.

In some embodiments, if there is no current home for the TSN group to which UE 122(1) belongs because this is the first TSN session for the TSN group, the AMF 132 can use the currently allocated vCU-UP 114(1) (e.g., as identified by PCF 138 in the response message at 307) as the TSN home vCU-UP for handling the data traffic for the UE 122(1) TSN session. Based on the response received from AMF 132 at 309, vCU-CP 112 performs, at 310, TSN PDU session establishment for UE 112(1) at vCU-UP 114(1) using the L2 PDU identifier for the TSN bridge received from AMF 132. Other information may be included in the signaling from vCU-CP 112 to vCU-UP 114(1) to establish billing for the UE TSN session, as discussed in further detail below.

In still some embodiments, if the vCU-UP identified by the AMF 132 in the response at 307 for the TSN home is different than the currently allocated vCU-UP for the UE 122(1) session based on TSN location information (e.g., either because the TSN group is homed to a different vCU-UP or another vCU-UP has a lower load than the currently allocated vCU-UP), AMF 132 can trigger a vCU-UP change for the TSN session for UE 122(1) at 311. Based on the trigger at 3110, vCU-CP 112 initiates, at 312, a relocation of the currently allocated vCU-UP for the UE 122(1) session to vCU-UP 114(1). As shown at 313, subsequent data traffic for UE 122(1) flows only locally through the vCU-UP 114(1) and not via UPF 130.

Figure 4:
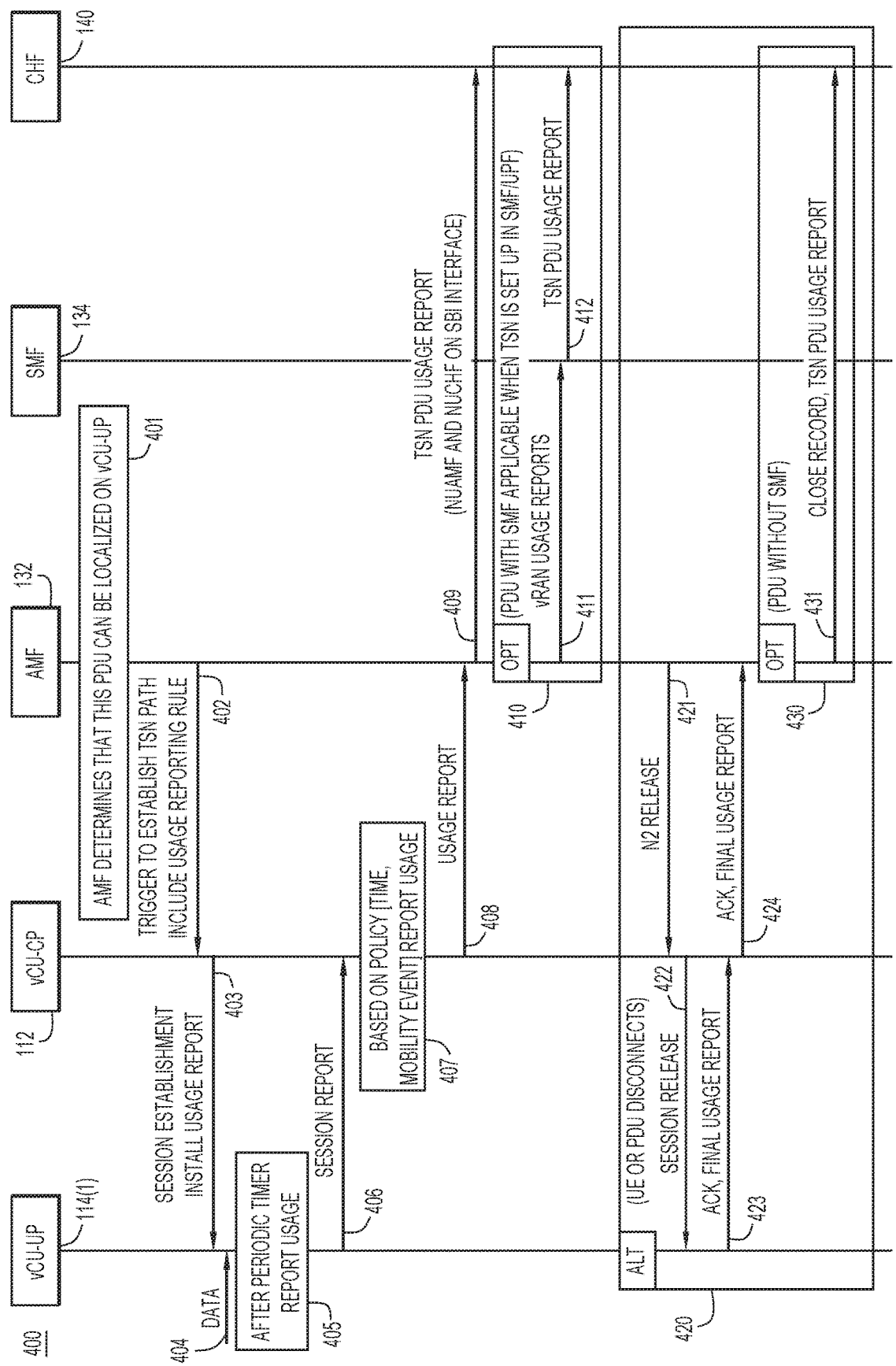
FIG. 4 is a message sequence diagram illustrating a call flow for facilitating usage reporting for user equipment data traffic associated with a TSN, according to an example embodiment.

Referring to FIG. 4, FIG. 4 is a message sequence diagram 400 illustrating a call flow for facilitating usage reporting for UE data traffic associated with a TSN, according to an example embodiment. FIG. 4 includes UE 122(1), vCU-UP 114(1), vCU-CP 112, AMF 132, SMF 134 and CHF 140. For FIG. 4, the call flow generally illustrates that usage reports for UE 122(1) can be sent from the vRAN 110 to AMF 132, which can either forward them to CHF 140 via the Namf/Nchf SBI for cases in which data traffic for the UE is localized within the vRAN 110, or AMF 132 can forward them to SMF 134 that can then forward them to CHF 140 via the Nsmf/Nchf SBI for cases in which a data session for the UE is created at UPF 130 or for cases in which the Namf/Nchf SBI between AMF 132 and CHF 140 has failed. Usage reporting can be provided for each TSN PDU session per UE for a TSN.

Thus, usage reporting can go from AMF 132 to CHF 140, which is beneficial as when the UE disconnects, the last usage report is only available on the AMF 132.

As illustrated at 401, AMF 132 determines that the PDU session for UE 122(1) can be localized within vRAN 110 on vCU-UP 114(1) based on the UDM response including an indication that TSN-Localization=TRUE for UE 122(1) and the policy information returned by PCF 138 (e.g., as discussed above).

Based on the determination at 401, AMF 132 sends, at 402, a trigger to vCU-CP 112 to establish a localized TSN path (bridge) for UE 122(1) for TSN 120 within the vRAN 110 at vCU-UP 114(1) in which the trigger includes a usage reporting rule or policy for the UE 122(1) TSN session. In at least one embodiment, the usage reporting rule may include time information (e.g., for a periodic timer) and/or mobility event information that may indicate when a usage report is to be sent for the UE 122(1) TSN PDU session. At 403, vCU-CP 112 performs TSN session establishment for UE 122(1) (not shown in FIG. 4) at vCU-UP 114(1) that involves usage report installation for the UE TSN PDU session.

After some time, it is assumed that data traffic for the TSN 120 is received/handled by vCU-UP 114(1) at 404 for the UE 122(1) TSN PDU session. After a period of time (e.g., based on policy, etc.), a periodic timer configured for vCU-UP 114(1) triggers at 405 to report usage for the UE 122(1) TSN session and a session report is sent at 406 from vCU-UP 114(1) to vCU-CP 112. At 407, vCU-CP 112 determines based on the reporting policy time and/or mobility event to report usage for the UE 122(1) TSN session. Based on the determination and the session report received from vCU-UP 114(1) at 406, vCU-CP 112 sends a usage report at 408. In at least one embodiment, a usage report may include a number of bytes of downlink data delivered to the UE and/or the number of bytes of uplink data received from the UE. Upon receiving the vRAN usage report, AMF 132 sends, at 409, the vRAN usage report as a TSN PDU usage report directly to CHF 140 via the Namf/Nchf SBI.

As shown at 410, for a case in which a TSN PDU session for UE 122(1) is with SMF 134 (e.g., as is applicable for cases in which the TSN bridge for UE 122(1) is set-up in the SMF 134/UPF 130) or in which the SBI between AMF 132 and CHF 140 is down, AMF 132 can send vRAN usage reports to SMF 134 at 411 and SMF 134 can send TSN PDU usage reports to CHF 140 at 412.

Operations that may be associated with a UE 122(1) disconnect or a PDU session disconnect are illustrated at 420. Based on a UE 122(1) disconnect or PDU disconnect for the UE 122(1) TSN PDU session, AMF 132 sends an N2 release message to vCU-CP 112 at 421, which triggers vCU-CP 112 to communicate a session release for UE 122(1) to vCU-UP 114(1) at 422. Based on receiving the session release, vCU-UP 114(1) sends to vCU-CP 112, at 423, and acknowledgment (ACK) of the release and a final usage report for the UE 122(1) TSN PDU session. At 424, vCU-CP 112 forwards the ACK and the final usage report to AMF 132.

As shown at 430, for a case in which the TSN PDU session for UE 122(1) data traffic is localized within the vRAN 110 (e.g., without the SMF 134/UPF 130), AMF 132 communicates to CHF 140 to close the billing/charging record for UE 122(1) including a TSN PDU usage report. In other cases in which a TSN PDU session for UE 122(1) is with SMF 134 or in which the SBI between AMF 132 and CHF 140 is down (not shown in FIG. 4), AMF 132 can communicate to SMF 134 to close the charging record for UE 122(1) including a TSN PDU usage report, which SMF 134 can forward to CHF 140.

Figure 5:
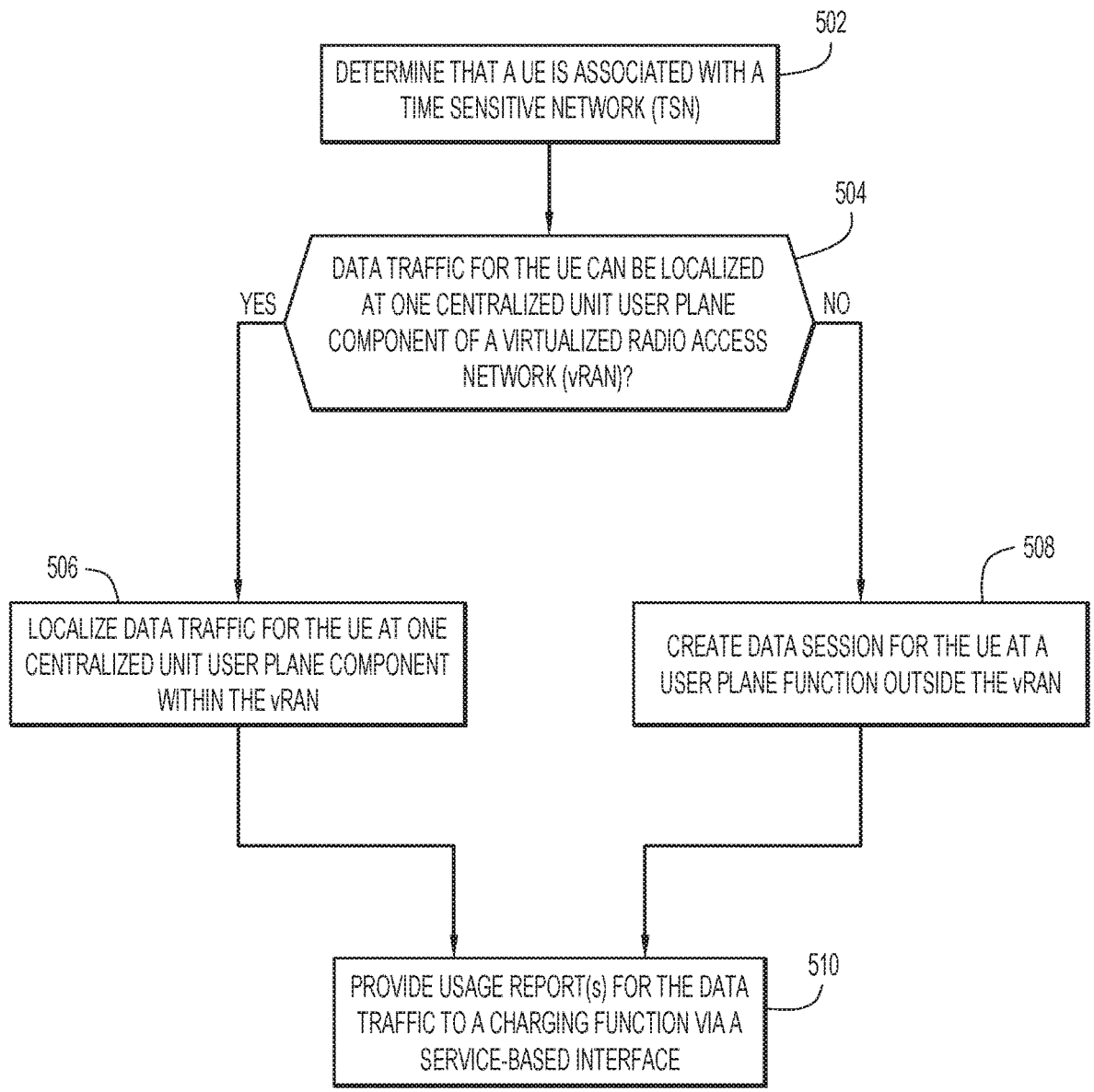
FIG. 5 is a flow chart depicting a method according to an example embodiment.

Referring to FIG. 5, FIG. 5 is a flow chart illustrating a method 500 according to an example embodiment. The method 500 may be performed, at least in part, by an AMF that is in communication with an SMF, UDM, PCF, CHF, and vCU-CP of a vRAN (e.g., as illustrated in FIGS. 1 and 3-4).

At 502, the AMF determines that a UE is associated with a time sensitive network. For example, the AMF can query the UDM to determine subscriber information associated with the UE that indicates TSN-Localization=TRUE and a TSN-Group-ID for the UE.

At 504, the AMF determines whether data traffic (e.g., a TSN PDU session) for the UE can be localized at one centralized unit user plane component of the vRAN (e.g., one vCU-UP). The determination at 504 is based on an exchange with the PCF in which the PCF returns information (e.g., the TSN-Localization parameter, the TSN-Group-ID parameter, a L2 PDU identifier for a TSN bridge to be set-up, a vCU-UP IP address or node_id, SARs, etc.) to the AMF that indicates whether the data traffic can be localized at one centralized unit user plane component or not.

Based on a determination that the data traffic for the UE can be localized to one centralized unit user plane component within the vRAN, the method can include, at 506, the AMF localizing the data traffic for the UE at one centralized unit user plane component within the vRAN for the TSN. The localizing at 506 can include creating a TSN bridge (via the vCU-CP) at the centralized unit user plane component for localizing the data traffic (e.g., the TSN PDU session) for the UE within the vRAN.

Returning to 504, based on a determination that the data traffic for the UE cannot be localized to one centralized unit user plane component within the vRAN, the method can include, at 508, creating a data session for the UE at a user plane function outside the vRAN. The session can be created via the SMF and a user plane function selected by the SMF.

At 510, the method can include the providing usage report(s) for the data traffic to the CHF via a service-based interface. The usage report(s) can be provided to the CHF using different techniques. For cases in which the data traffic for the UE is localized within the vRAN, the AMF receive usage reports from the vRAN (via the vCU-CP) and can send the usage reports directly to the CHF via the Namf/Nchf SBI. For cases in which a data session is created for the UE via the SMF/user plane function or in which the interface between the AMF and the CHF is down, the AMF can receive usage reports from the vRAN (via the vCU-CP) and can send the usage reports to the SMF, which can then send the reports to the CHF. For multiple UEs belonging to a TSN, usage reports can be provided to the CHF for each TSN PDU session per UE.

In summary, a system and method are provided to optimize the vRAN architecture to serve a TSN, first by selecting appropriate vRAN or UPF nodes, and second by performing local diversion of TSN traffic within the vRAN to allow an optimal low-latency path for TSN sessions.

FIG. 6 illustrates a hardware block diagram of a computing device 600 that may perform the functions of any of nodes, functions, elements, etc. of system 100, referred to herein in connection with FIGS. 1-5 (e.g., AMF 132, UDM 136, PCF 138, vCU-CP 112, etc.). It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 522. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for control logic 617 (e.g., for an AMF, UDM, PCF, vCU-CP, etc.) may be stored in memory 616 or persistent memory 518 for execution by processor(s) 614. When the processor(s) 614 execute the control logic 617, the processor(s) 614 are caused to perform the operations (e.g., for an AMF, UDM, PCF, vCU-CP, etc.) described above in connection with FIGS. 1-5.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface(s) 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

In one form, a computer-implemented method is provided and may include determining that a user equipment (UE) is associated with a time sensitive network; and localizing data traffic for the UE within a virtualized radio access network based on determining that the data traffic for the UE can be localized at one centralized user plane component of the virtualized radio access network for the time sensitive network. The virtualized radio access network may include a plurality of distributed user plane components and a plurality of centralized user plane components. The data traffic can be Layer-2 (L2) data traffic or unstructured data traffic. The determining and the localizing can be performed, at least in part, by an access and mobility management function.

In some cases, the computer-implemented method may include creating a data session for the UE on a user plane function outside the virtualized radio access network based on determining that the data traffic for the UE cannot be localized at one centralized user plane component of the virtualized radio access network for the time sensitive network.

For the computer-implemented method, determining that the data traffic for the UE can be localized at one centralized user plane component of the virtualized radio access network for the time sensitive network may include identifying that the UE is a candidate for having the data traffic localized within the virtualized radio access network based on subscriber information stored for the UE at a unified data management network element. The subscriber information may include a group identifier for a group comprising a plurality of UE that are associated with the time sensitive network, wherein the UE is a member of the group.

Further for the computer-implemented method, determining that the data traffic for the UE can be localized at one centralized user plane component of the virtualized radio access network for the time sensitive network may further include: determining whether other UE of the group currently have data traffic associated with the time sensitive network; based on determining that no other UE of the group currently has data traffic associated with the time sensitive network, selecting a centralized user plane component of the virtualized radio access network to handle the data traffic for the UE for the time sensitive network; based on determining that other UE of the group currently have data traffic that is handled at a particular centralized user plane component of the virtualized radio access network, determining whether the particular centralized user plane component is within a serving area of the UE; based on determining that the particular centralized user plane component is within the serving area of the UE, localizing the data traffic for the UE to the particular centralized user plane component; and based on determining that the particular centralized user plane component is not within the serving area of the UE, creating a data session for the UE at a user plane function outside the virtualized radio access network.

Further for the computer-implemented method, based on determining that no other UE of the group currently has data traffic associated with the time sensitive network, selecting the centralized user plane component of the virtualized radio access network to handle the data traffic for the UE comprises selecting the centralized user plane component having a lowest load within a serving area of the UE.

The computer-implemented method may further include providing, for a plurality of UE that are associated with the time sensitive network, at least one usage report associated with data traffic for each time sensitive network packet data unit session per UE of the plurality of UE to a charging function. Further for the computer-implemented method, the at least one usage report can be provided from an access and mobility management function to the charging function via a service-based interface. Further for the computer-implemented method, the at least one usage report can be provided from an access and mobility management function to a session management function when a data session for at least one UE is created on a user plane function outside the virtualized radio access network in which the computer-implemented method may further include the session management function providing the usage report to the charging function via a service-based interface.

In another form, one or more non-transitory computer readable storage media encoded with instructions may be provided that, when executed by a processor, cause the processor to perform operations, comprising determining that the data traffic for the UE can be localized at one centralized user plane component of the virtualized radio access network for the time sensitive network may include identifying that the UE is a candidate for having the data traffic localized within the virtualized radio access network based on subscriber information stored for the UE at a unified data management network element.

In still another form, a system may be provided that may include at least one memory element for storing data; and at least one processor for executing instructions associated with the data, wherein executing the instructions causes the system to perform operations, comprising: determining that a user equipment (UE) is associated with a time sensitive network; and localizing data traffic for the UE within a virtualized radio access network based on determining that the data traffic for the UE can be localized at one centralized user plane component of the virtualized radio access network for the time sensitive network The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium, or the like (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The system may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of a non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions, which can be inclusive of non-transitory computer readable program instructions, for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining that a user equipment (UE) is associated with a time sensitive network; and
    localizing data traffic for the UE to flow only within a virtualized radio access network based on determining that the data traffic for the UE can be localized at one virtualized central unit user plane (vCU-UP) component of the virtualized radio access network for the time sensitive network, wherein determining that the data traffic for the UE can be localized at the one vCU-UP component comprises:
    identifying a group identifier for the UE for a group comprising at least one other UE that is associated with the time sensitive network; and
    localizing the data traffic for the UE at the one vCU-UP component that is either:
        a first vCU-UP component based on determining that no other UE of the group currently has data traffic associated with the time sensitive network, wherein the localizing comprises selecting the first vCU-UP component based, at least in part, on the first vCU-UP component having a lowest load within a serving area of the UE; or
        a second vCU-UP component based on determining that at least one other UE of the group currently has data traffic that is handled at the second vCU-UP component and that the second vCU-UP component is within a serving area of the UE.

2. The method of claim 1, wherein the virtualized radio access network comprises a plurality of virtualized distributed unit (vDU) components that interface with the one vCU-UP component.

3. The method of claim 1, wherein the data traffic is Layer-2 data traffic or unstructured data traffic.

4. The method of claim 1, wherein determining that the data traffic for the UE can be localized at one vCU-UP component of the virtualized radio access network for the time sensitive network further comprises:
    identifying that the UE is a candidate for having the data traffic localized within the virtualized radio access network based on subscriber information stored for the UE at a unified data management network element.

5. The method of claim 4, wherein the subscriber information includes the group identifier for the UE for the group comprising the at least one other UE that is associated with the time sensitive network.

6. The method of claim 1, further comprising:
    providing, for at least one of the UE or the at least one other UE, at least one usage report associated with data traffic for each time sensitive network packet data unit session per at least one of the UE or the at least one other UE to a charging function.

7. The method of claim 6, wherein the at least one usage report is provided from an access and mobility management function to the charging function via a service-based interface.

8. One or more non-transitory computer readable storage media encoded with instructions that, when executed by a processor, cause the processor to perform operations, comprising:
    determining that a user equipment (UE) is associated with a time sensitive network; and
    localizing data traffic for the UE to flow only within a virtualized radio access network based on determining that the data traffic for the UE can be localized at one virtualized central unit user plane (vCU-UP) component of the virtualized radio access network for the time sensitive network, wherein determining that the data traffic for the UE can be localized at the one vCU-UP component comprises:
    identifying a group identifier for the UE for a group comprising at least one other UE that is associated with the time sensitive network; and
    localizing the data traffic for the UE at the one vCU-UP component that is either:
        a first vCU-UP component based on determining that no other UE of the group currently has data traffic associated with the time sensitive network, wherein the localizing comprises selecting the first vCU-UP component based, at least in part, on the first vCU-UP component having a lowest load within a serving area of the UE; or
        a second vCU-UP component based on determining that at least one other UE of the group currently has data traffic that is handled at the second vCU-UP component and that the second vCU-UP component is within a serving area of the UE.

9. The media of claim 8, wherein the data traffic is Layer-2 data traffic or unstructured data traffic.

10. The media of claim 8, wherein determining that the data traffic for the UE can be localized at one vCU-UP component of the virtualized radio access network for the time sensitive network further comprises:
    identifying that the UE is a candidate for having the data traffic localized within the virtualized radio access network based on subscriber information stored for the UE at a unified data management network element, wherein the subscriber information includes the group identifier for the UE for the group comprising the at least one other UE that is associated with the time sensitive network.

11. The media of claim 8, further comprising instructions that, when executed by the processor, cause the processor to perform further operations, comprising:
    providing, for a plurality of UE that are associated with the time sensitive network, at least one usage report associated with data traffic for each time sensitive network packet data unit session per UE of the plurality of UE to a charging function.

12. A system comprising:
    at least one memory element for storing data; and
    at least one processor for executing instructions associated with the data, wherein executing the instructions causes the system to perform operations, comprising:
        determining that a user equipment (UE) is associated with a time sensitive network; and
        localizing data traffic for the UE to flow only within a virtualized radio access network based on determining that the data traffic for the UE can be localized at one virtualized central unit user plane (vCU-UP) component of the virtualized radio access network for the time sensitive network, wherein determining that the data traffic for the UE can be localized at the one vCU-UP component comprises:
identifying a group identifier for the UE for a group comprising at least one other UE that is associated with the time sensitive network; and
localizing the data traffic for the UE at the one vCU-UP component that is either:
a first vCU-UP component based on determining that no other UE of the group currently has data traffic associated with the time sensitive network wherein the localizing comprises selecting the first vCU-UP component based, at least in part, on the first vCU-UP component having a lowest load within a serving area of the UE; or
a second vCU-UP component based on determining that at least one other UE of the group currently has data traffic that is handled at the second vCU-UP component and that the second vCU-UP component is within a serving area of the UE.

13. The system of claim 12, wherein the data traffic is Layer-2 data traffic or unstructured data traffic.

14. The method of claim 1, wherein the UE is a first UE and the data traffic for the first UE flows only within the virtualized radio access network between the first UE and a second UE of the virtualized radio access network.

15. The method of claim 1, wherein the data traffic is localized at the one vCU-UP component utilizing a Layer-2 Ethernet bridge for the one vCU-UP component.

16. The system of claim 12, wherein the data traffic is localized at the one vCU-UP component utilizing a Layer-2 Ethernet bridge for the one vCU-UP component.

17. The system of claim 12, wherein the virtualized radio access network comprises a plurality of virtualized distributed unit (vDU) components that interface with the one vCU-UP component.

18. The system of claim 12, wherein determining that the data traffic for the UE can be localized at one vCU-UP component of the virtualized radio access network for the time sensitive network further comprises:
identifying that the UE is a candidate for having the data traffic localized within the virtualized radio access network based on subscriber information stored for the UE at a unified data management network element, wherein the subscriber information includes the group identifier for the UE for the group comprising the at least one other UE that is associated with the time sensitive network.

19. The system of claim 12, wherein executing the instructions causes the system to perform further operations, comprising:
providing, for at least one of the UE or the at least one other UE, at least one usage report associated with data traffic for each time sensitive network packet data unit session per at least one of the UE or the at least one other UE to a charging function.

20. The system of claim 19, wherein the at least one usage report is provided from an access and mobility management function to the charging function via a service-based interface.

* * * * *